(12) United States Patent
Rahl

(10) Patent No.: US 9,222,709 B2
(45) Date of Patent: Dec. 29, 2015

(54) SOLAR THERMAL AIR CONDITIONING UNIT

(71) Applicant: Steven Richard Rahl, Naples, FL (US)

(72) Inventor: Steven Richard Rahl, Naples, FL (US)

( * ) Notice: Subject to any disclaimer, the term of this patent is extended or adjusted under 35 U.S.C. 154(b) by 165 days.

(21) Appl. No.: 14/159,514

(22) Filed: Jan. 21, 2014

(65) Prior Publication Data
US 2014/0223945 A1    Aug. 14, 2014

Related U.S. Application Data

(60) Provisional application No. 61/762,679, filed on Feb. 8, 2013.

(51) Int. Cl.
| | |
|---|---|
| F25B 27/00 | (2006.01) |
| F25B 39/02 | (2006.01) |
| F24J 2/05 | (2006.01) |
| F24J 2/32 | (2006.01) |
| F24J 2/34 | (2006.01) |
| F28D 1/04 | (2006.01) |
| F25B 13/00 | (2006.01) |
| F25B 21/02 | (2006.01) |
| F24F 5/00 | (2006.01) |
| F28F 9/02 | (2006.01) |
| F28D 1/047 | (2006.01) |
| F28D 15/02 | (2006.01) |
| F28D 20/00 | (2006.01) |

(52) U.S. Cl.
CPC .............. *F25B 27/005* (2013.01); *F24J 2/055* (2013.01); *F24J 2/32* (2013.01); *F24J 2/345* (2013.01); *F25B 39/02* (2013.01); *F28D 1/0461* (2013.01); *F24F 2005/0064* (2013.01); *F25B 13/00* (2013.01); *F25B 21/02* (2013.01); *F28D 1/0477* (2013.01); *F28D 15/0275* (2013.01); *F28D 2020/0078* (2013.01); *F28F 9/0234* (2013.01); *Y02B 10/20* (2013.01); *Y02B 10/24* (2013.01)

(58) Field of Classification Search
CPC ........ F25B 27/005; F25B 39/02; F25B 13/00; F25B 21/02; F24J 2/345; F24J 2/055; F24J 2/32; Y02B 10/20; Y02B 10/24; F28D 1/0477; F28D 15/0275; F28D 2020/0078; F28D 1/0461; F28F 9/0234; F24F 2005/006
USPC ................................................. 62/235.1, 236
See application file for complete search history.

(56) References Cited

U.S. PATENT DOCUMENTS

| | | | | |
|---|---|---|---|---|
| 4,070,870 A | * | 1/1978 | Bahel | F24D 11/003 237/2 B |
| 4,128,124 A | * | 12/1978 | Worthington | F24D 11/003 126/616 |
| 4,169,554 A | * | 10/1979 | Camp | F24F 3/001 126/610 |
| 4,303,059 A | * | 12/1981 | Ford | F24J 2/055 126/655 |
| 4,474,170 A | * | 10/1984 | McConnell | F24J 2/055 118/317 |
| 4,474,173 A | * | 10/1984 | Ford | F24J 2/055 126/663 |

(Continued)

*Primary Examiner* — Mohammad M Ali

(57) ABSTRACT

A solar thermal air conditioning unit is provided. The solar thermal air condition unit includes a pressurized water tank with a water entrance port for receiving water. A copper coil tube may be within the pressurized water tank. The copper coiled tube may include a liquid refrigerant inlet and a gas refrigerant outlet. A solar heat converter may be connected to the pressurized water tank and may heat the water within the pressurized water tank, thereby heating the copper coil tube. The liquid refrigerant may be injected into the copper coil tube via the liquid refrigerant inlet and travels through the copper coil and is heated, thereby turning the liquid refrigerant to a gas refrigerant.

11 Claims, 4 Drawing Sheets

(56) References Cited

U.S. PATENT DOCUMENTS

| | | | | |
|---|---|---|---|---|
| 4,483,322 A * | 11/1984 | Mori | F24J 2/345 | 126/609 |
| 5,660,165 A * | 8/1997 | Lannes | F24D 17/0068 | 122/14.2 |
| 2004/0237557 A1* | 12/2004 | Harmon | F24H 1/181 | 62/238.6 |
| 2007/0144574 A1* | 6/2007 | Yada | F28D 15/0233 | 136/246 |
| 2009/0007900 A1* | 1/2009 | Leifer | F24F 5/0017 | 126/400 |
| 2009/0121488 A1* | 5/2009 | Bhatti | F01K 9/003 | 290/54 |
| 2009/0288695 A1* | 11/2009 | Jaisinghani | F03G 6/001 | 136/244 |
| 2010/0031953 A1* | 2/2010 | Penev | F24D 17/0021 | 126/615 |
| 2010/0132914 A1* | 6/2010 | Watanabe | F24D 11/0221 | 165/10 |
| 2010/0199973 A1* | 8/2010 | Hook | F24J 2/055 | 126/610 |
| 2011/0108092 A1* | 5/2011 | Le Lievre | F24J 2/085 | 136/246 |
| 2011/0114081 A1* | 5/2011 | Lee | F24J 2/055 | 126/643 |
| 2011/0253127 A1* | 10/2011 | Lowe | F24J 2/055 | 126/641 |
| 2011/0303216 A1* | 12/2011 | Lowenstein | F24J 2/055 | 126/636 |
| 2012/0117986 A1* | 5/2012 | Hammond | F24F 5/0014 | 62/79 |
| 2012/0125321 A1* | 5/2012 | Graboski | F28D 7/022 | 126/643 |
| 2012/0131941 A1* | 5/2012 | Ackner | F24D 5/12 | 62/235.1 |
| 2012/0145144 A1* | 6/2012 | Lin | F24J 2/02 | 126/617 |
| 2012/0145145 A1* | 6/2012 | Lin | F24J 2/02 | 126/617 |
| 2012/0279554 A1* | 11/2012 | Bostwick | F24J 2/055 | 136/248 |

\* cited by examiner

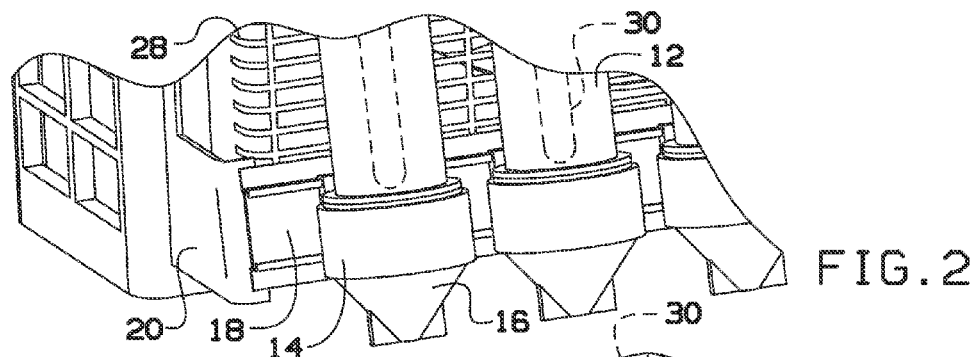
FIG.2
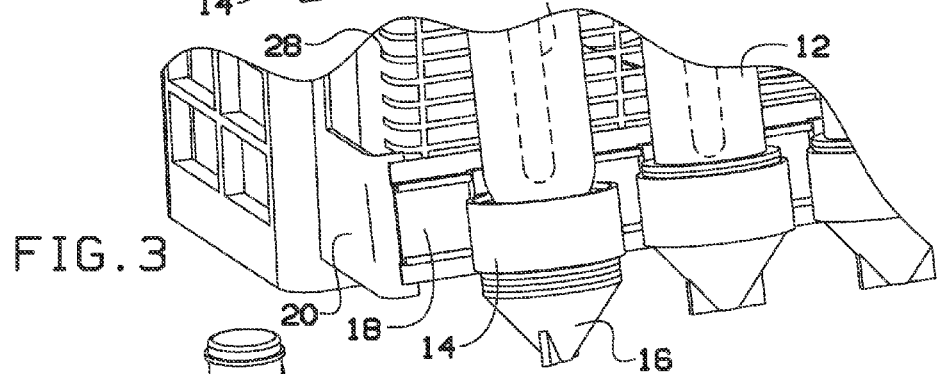
FIG.3
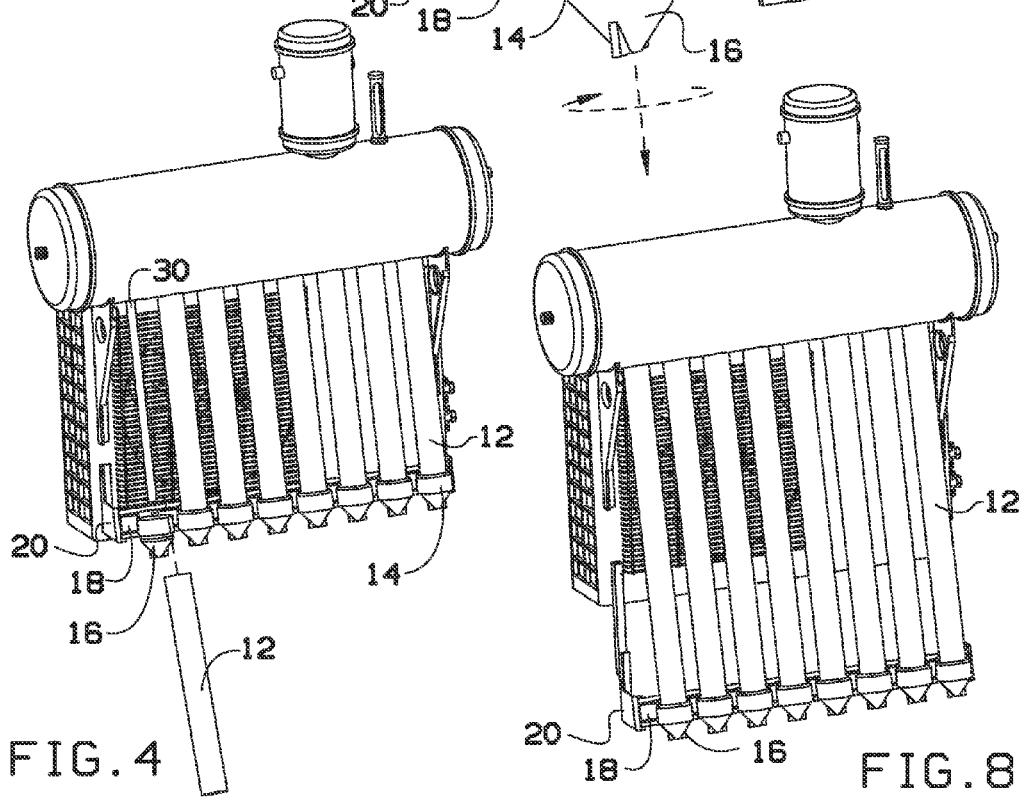
FIG.4
FIG.8

SOLAR THERMAL AIR CONDITIONING UNIT

CROSS-REFERENCE TO RELATED APPLICATION

This application claims the benefit of priority of U.S. provisional application No. 61/762,679, filed Feb. 8, 2013, the contents of which are herein incorporated by reference.

BACKGROUND OF THE INVENTION

The present invention relates to a triple solar thermal air condition unit and, more particularly, to a water tank with an internal copper coil tubing configured to heat a liquid refrigerant to a gas refrigerant using solar energy.

An air conditioner is a major or home appliance, system, or mechanism designed to change the air temperature and humidity within an area (used for cooling and sometimes heating depending on the air properties at a given time). The cooling is typically done using a simple refrigeration cycle, but sometimes evaporation is used, commonly for comfort cooling in buildings and motor vehicles. Currently, air conditioning systems consume a lot of energy. Further air conditioning systems do not produce hot water, drinking water, or direct current.

As can be seen, there is a need for a multi-purpose air conditioner that uses solar thermal energy.

SUMMARY OF THE INVENTION

In one aspect of the present invention, a solar thermal air conditioning system comprises: a pressurized water tank comprising a water entrance port; a copper coil tube within the pressurized water tank comprising a liquid refrigerant inlet and a gas refrigerant outlet; a solar heat converter connected to the pressurized water tank and configured to heat water within the pressurized water tank, thereby heating the copper coil tube, wherein a liquid refrigerant is injected into the copper coil tube via the liquid refrigerant inlet and travels through the copper coil and is heated, thereby turning the liquid refrigerant to a gas refrigerant.

These and other features, aspects and advantages of the present invention will become better understood with reference to the following drawings, description and claims.

BRIEF DESCRIPTION OF THE DRAWINGS

FIG. 2 is a detail perspective view of the present invention illustrating a quick change holder in a secure configuration;

FIG. 3 is a detail perspective view of the present invention illustrating a quick change holder in an unsecure configuration;

FIG. 4 is a perspective view of the present invention illustrating removal of an evacuated glass tube of FIG. 1;

FIG. 8 is a perspective view of an alternate embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention may include a thermal solar air-conditioner that absorbs solar energy from the sun, outside ambient temperatures, and a condenser to heat refrigerant, such as R410A, from a cold liquid to a hot vapor, by using vacuum solar collectors and copper rods for heat conduction. Further, the present invention may operate with dual condensers, dual capillaries, reverse heat valves, and hot and cold heat sinks with semi conductors producing electricity. The refrigerant from the compressor goes through the copper coiled inside a high density pressurized heated thermal tank, which undertakes a heat exchange. The refrigerant then is heated by four methods of heat exchange in the solar collectors before going through a cycle inside a thermal solar air conditioner, i.e. from cooling to heating and heating to cooling. Further, the solar air conditioner of the present invention may include thermal self absorbent technology producing 12V to 24V of energy.

Figure 1:
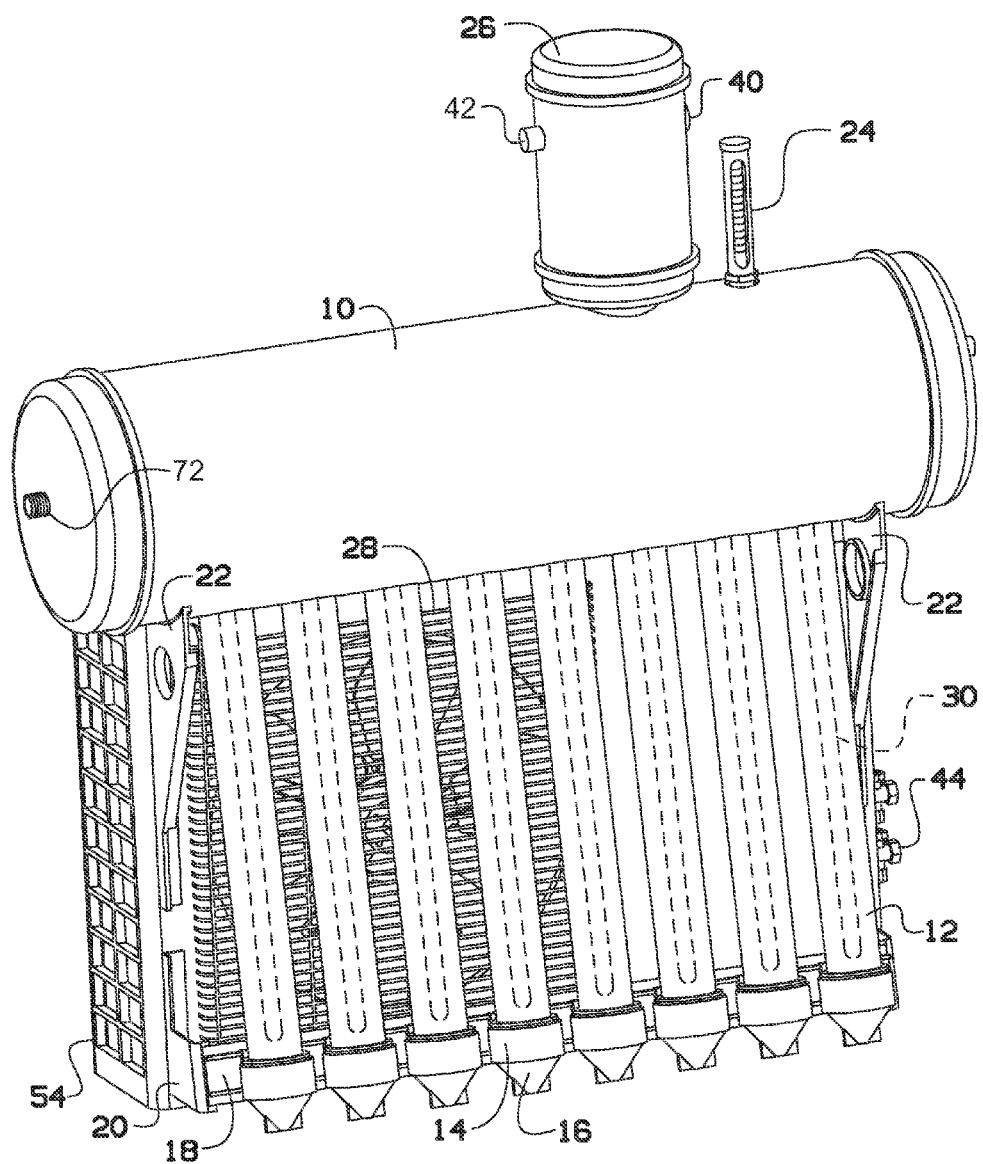
FIG. 1 is a perspective view of the present invention.
Figure 5:
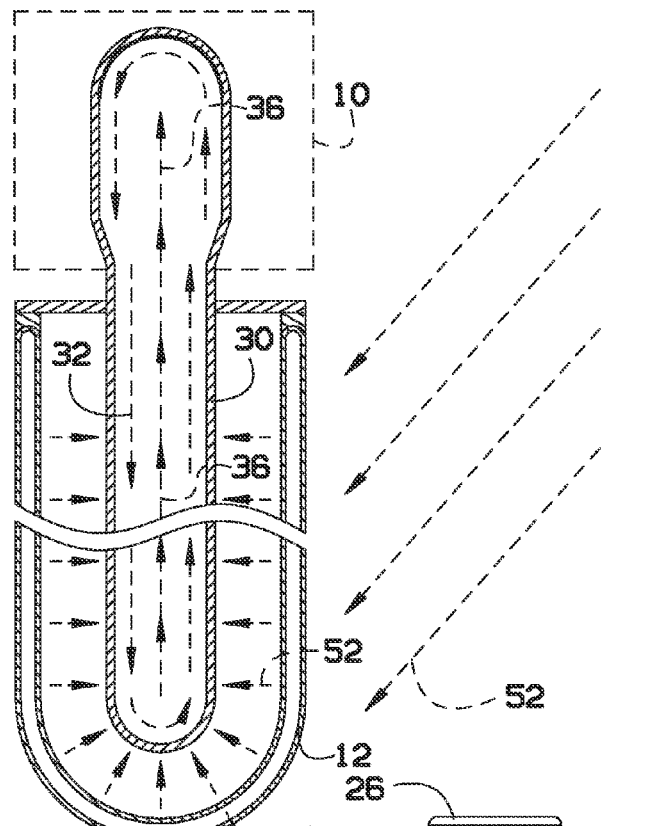
FIG. 5 is a detail section view of the evacuated glass tube and associated inner components.
Figure 6:
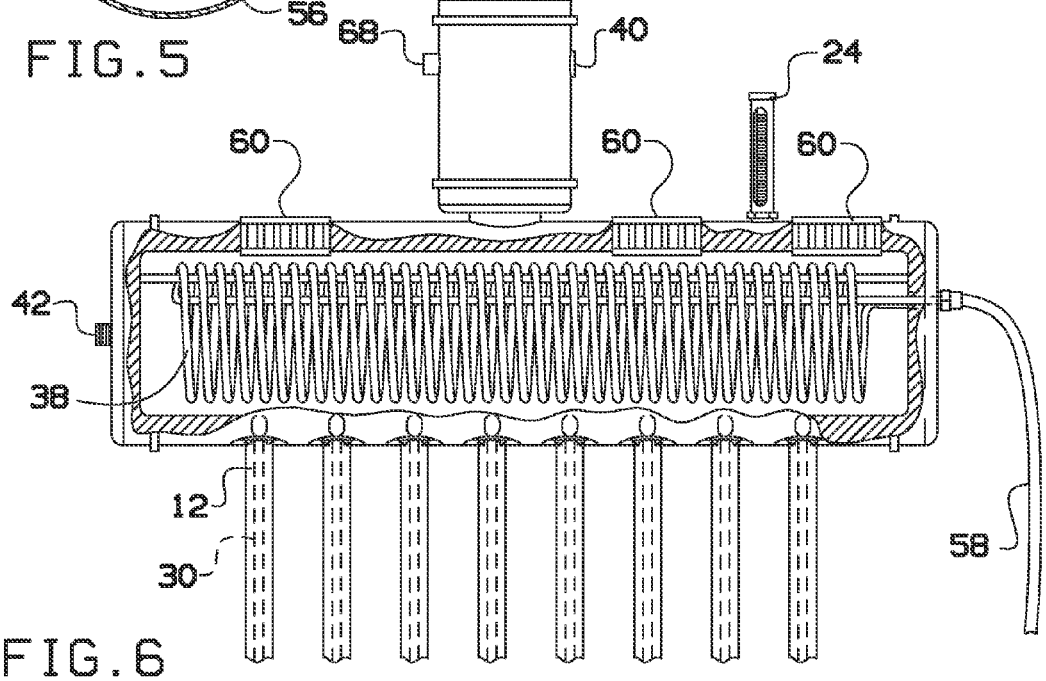
FIG. 6 is front section detail view of the pressurized water tank of FIG. 1 illustrating inner components.
Figure 7:
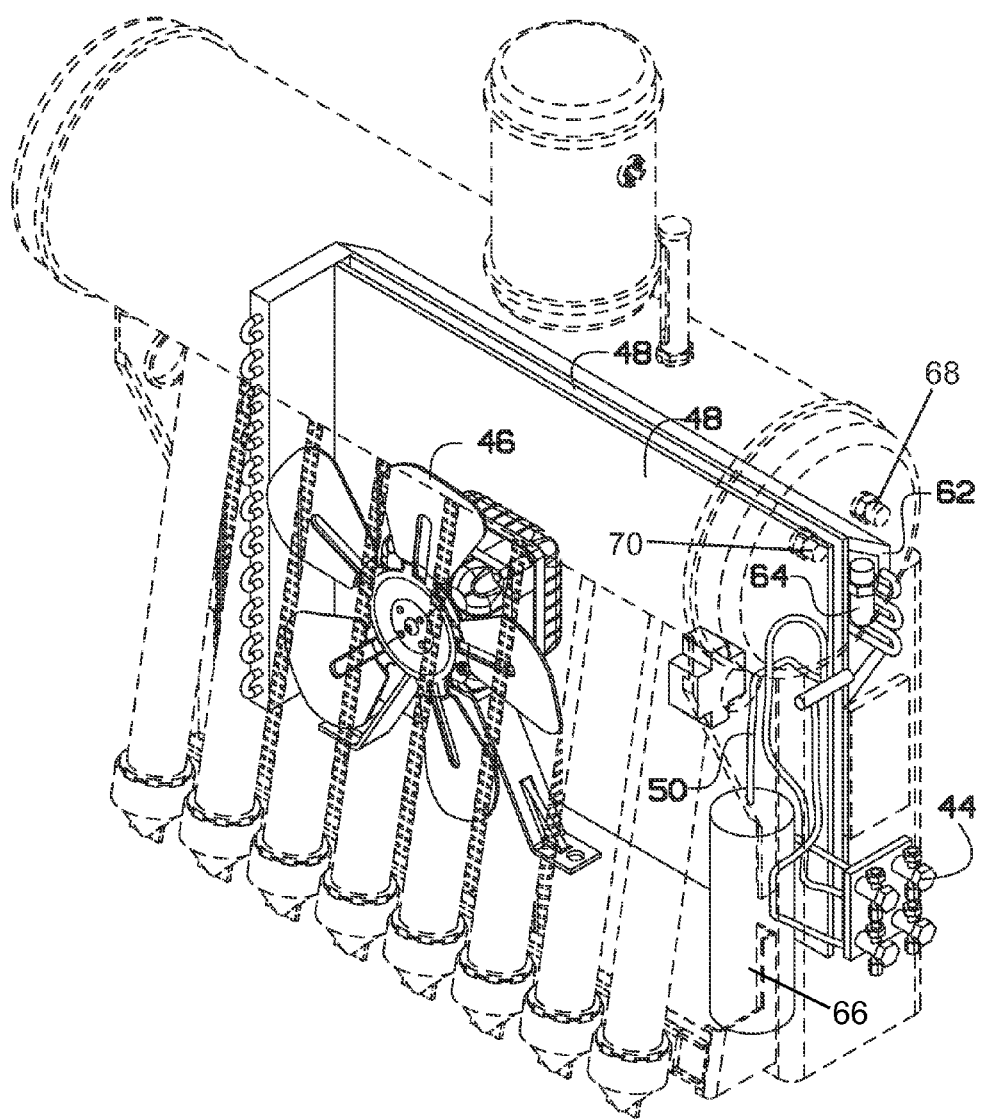
FIG. 7 is a perspective view of the inner components of the present invention.

Referring to FIGS. 1 through 8, the present invention may include a solar thermal air conditioning unit with a pressurized water tank 10. The pressurized water tank 10 may include a water entrance port 40 for receiving water. A copper coil tube 38 may be within the pressurized water tank 10. The copper coiled tube 38 may include a liquid refrigerant inlet 68 and a gas refrigerant outlet 70. A solar heat converter may be connected to the pressurized water tank 10 and may heat the water within the pressurized water tank 10, thereby heating the copper coil tube 38. The liquid refrigerant may be injected into the copper coil tube 38 via the liquid refrigerant inlet 68 and travels through the copper coil and is heated, thereby turning the liquid refrigerant to a gas refrigerant.

The pressurized water tank 10 of the present invention may be an inner reinforced pressurized water tank for thermal heating. The inner and outside shell may be made of SUS316 food grade stainless steel plates, welded by argon arc. The outer coating may be a modified liquid nylon formulation that provides protection to overcome all material limitations and may guard metal from wear, salt, corrosion, friction, and conductivity. The tank 10 may include a clear fluid base designed to eliminate pinholes and create a void free impervious barrier. There may be a thick polyurethane insulation 55 mm providing 24 hour heat control.

An assist tank 26 and a thermometer thermostat 24 may be attached to the water tank 10. The assist tank 26 may include a compact thermal heat tank cold water entrance port 40, so that the water tank 10 may be filled with water. The assist tank 26 may further include a release valve 42 to release pressure. For example, the release valve 42 may release pressure when the PSI levels rise above 65. The inner copper coil 38 may be within the water tank 10. A solar energy capturing device may be connected to the water tank 10 and may transfer heat to the water within the water tank 10. The solar technology may include, but is not limited to, evacuated tube collectors and flat plate technology.

The evacuated tub collectors may include an evacuated glass tube 12 that may releasably connect with the tank 10 by silicon rings. The tubes 12 may be vacuum sealed 56 to the water tank 10. The tubes 12 provide a stable solar ambient heat conversion by passively tracking the sun and outside ambient temperatures with help from a condenser 48. A copper heat conductor 30 may extend from inside of the water tank 10 to the inside of the tubes 12. The thermal energy 52 may heat up the copper heat conductor 30, which in turn heats up air 32 within the copper heat conductor 30. The hot air rises 36 to the portion of the copper heat conductor 30 within the water tank 10 and thereby heating the water to a boiling point.

The liquid inlet 68 may be used to inject liquid refrigerant into the inner copper coil 38 within the water tank 10 through a hose 58. The boiling water within the water tank 10 may heat the liquid refrigerant within the copper coil 38. The liquid refrigerant vaporizes and exits the water tank at the gas outlet 70. The gas outlet 70 may be connected to the copper line connections 44 by tubing. The copper line connections 44 may run to an air conditioner component.

The air conditioner component may include a reverse heat valve 64, a compressor 66, dual inline high pressure capillaries 50, and a condenser 48. The refrigerant gas is directed through the copper line connections 44 and into the reverse heat valve 64. From the reverse heat valve 64, the gas goes into a compressor 66. Since the refrigerant is entering the air conditioner compressor 66 as a gas, the energy needed for the air conditioner is reduced. From the compressor 66, the gas may go back to the reverse heat valve 62 and into the dual capillaries 50 sending the evaporated refrigerant to the condensers 48. The condensers 48 converts the evaporated gas to a cold liquid, and directs the cold liquid into a triple evaporator 62 providing cold air for the blower system of the air conditioner. In certain embodiments, the triple evaporator 62 may include a UV light. The UV light operates while the unit is running, providing cold or hot bacteria free air, by killing any bacteria that are forming.

In certain embodiments, at least one heat sink thermal wafer 60 may be mounted to the surface of the water tank 10. When direct current (DC) moves across the outer side of the water tank 10, it causes a temperature differential between the thermal hot plate receiving continuous heat from 50° to 220°. As a result, the thermoelectric cooler face may be cooled while its opposite face is simultaneously heated by thermal heat conduction. If the heat generated on the hot side of the heat sink is effectively dissipated into heat sinks and further into the surrounding environment, the temperature on the thermoelectric cooler cold side may be much lower than that of the ambient by 50% and more in colder degrees. The thermoelectric coolers cooling capacity is proportional to the current passing through fractions of Watts to hundreds of Watts depending on the quantity of thermal energy wafer 60 and thermal heat conduction. The colder temperatures create the DC current, since the hot and cold ions are connecting. A DC to AC converter may be connected to the wafers 60 to power household items.

The air conditioning unit of the present invention may include a unit shell 54. The unit shell 54 may support the tank 10 by tank brackets 22. Further, the unit shell 54 may include a fan 46 blowing hot exhaust air onto the evacuated glass tubes 12. A grating 28 may separate the fan 46 and the tubes 12. In certain embodiments, the evacuated glass tubes 12 may be easily detachable from the unit shell 54. The tubes 12 may be secured to the unit shell 54 by a tube bracket including a quick change holder inner bracket 16 and a quick change holder outer bracket 14. The quick change holder outer bracket 14 may be attached to a rail 18 attached to the unit shell 54 by a side rail bracket 20. The inner bracket 16 may be easily unscrewed from the outer bracket 14 so that the glass tubes 12 may be easily removed, providing access to the copper heat conductor 30 for replacement or repair.

In certain embodiments, the present invention may further provide hot water as well as drinking water. A hot water outlet 72 may be attached directly to the water tank 10. Therefore, a user may connect a hose to the hot water outlet 72 to receive the hot water from within the tank 10. Further, the dual condenser 48, the evaporator, and blower unit may produce condensation. The present invention may further include a collection pan to collect the runoff water from the condensation produced from the evaporator and condenser. The UV light may be used to disinfect the water so that the runoff water may be used as drinking water.

It should be understood, of course, that the foregoing relates to exemplary embodiments of the invention and that modifications may be made without departing from the spirit and scope of the invention as set forth in the following claims.

What is claimed is:

1. A solar thermal air conditioning system comprising:
a pressurized water tank comprising a water entrance port;
a copper coil tube within the pressurized water tank comprising a liquid refrigerant inlet and a gas refrigerant outlet;
a solar heat converter connected to the pressurized water tank and configured to heat water within the pressurized water tank, thereby heating the copper coil tube,
wherein a liquid refrigerant is injected into the copper coil tube via the liquid refrigerant inlet and travels through the copper coil and is heated,
thereby turning the liquid refrigerant to a gas refrigerant;
wherein the air conditioning system further comprising a reverse heat valve comprising an intake configured to receive the gas refrigerant from the gas refrigerant outlet;
a compressor configured to receive the gas refrigerant from the reverse heat valve and transfer the gas refrigerant back into the reverse heat valve; a dual inline high pressure capillaries receiving the gas refrigerant from the compressor; and a condenser receiving the gas refrigerant from the dual inline high pressure capillaries and transforming the gas refrigerant into a cold liquid; the air conditioning system further comprises a triple evaporator and blower system that receives the cold liquid; the air conditioning system further comprising a UV light directed towards the triple evaporator.

2. The solar thermal air conditioning system of claim 1, wherein the solar heat converter is an evacuated tube collecting system.

3. The solar thermal air conditioning system of claim 2, wherein the evacuated tub collecting system comprising: a plurality of copper heat conductors comprising a portion within the water tank and a portion outside of the water tank; and a plurality of evacuated glass tubes comprising an open end vacuum sealed to the water tank, wherein the portion of each of the copper heat conductors that is outside of the water tank is within the evacuated glass tubes.

4. The solar thermal air conditioning system of claim 3, wherein the plurality of evacuated glass tubes and the plurality of copper heat conductors are removably attachable to the water tank.

5. The solar thermal air conditioning system of claim 2, further comprising a unit shell having a top end and a bottom end, wherein the unit shell comprises a tank bracket near the top end to support the water tank, and a tube bracket to support the evacuated tube collecting system, thereby orienting the evacuated tube collecting system below the water tank.

6. The solar thermal air conditioning system of claim 5, further comprising a fan directed to blow hot air on the evacuated tube collecting system.

7. The solar thermal air conditioning system of claim 1, further comprising a thermometer monitoring the temperature of the water within the water tank.

8. The solar thermal air conditioning system of claim 1, further comprising an assist tank protruding from and attached to the water tank, wherein the assist tank comprises the water entrance port.

9. The solar thermal air conditioning system of claim 1, further comprising a water exit port attached to the water tank.

10. The solar thermal air conditioning system of claim 1, further comprising at least one heat sink thermal energy wafer attached to a surface of the tank wherein the at least one heat sink thermal energy wafer comprises a hot side that is in contact with the water within the water tank and a cold side which is in contact with air outside of the water tank.

11. The solar thermal air conditioning system of claim 1, further comprising a release valve operable to release pressure from the water tank.

* * * * *